US008699054B2

(12) United States Patent
Edwards et al.

(10) Patent No.: US 8,699,054 B2
(45) Date of Patent: Apr. 15, 2014

(54) MEDIA SELECTION METHODS IN A MULTI-MEDIA PRINTER UTILIZING PRINT CLIENT INDICATORS

(75) Inventors: Richard M. Edwards, Copley, OH (US); Alan J. Gilbert, Hudson, OH (US); Gary W. Keefe, Brecksville, OH (US); Peter O. Botten, Lakewood, OH (US)

(73) Assignee: Codonics, Inc., Middleburg Heights, OH (US)

( * ) Notice: Subject to any disclaimer, the term of this patent is extended or adjusted under 35 U.S.C. 154(b) by 931 days.

(21) Appl. No.: 10/719,871

(22) Filed: Nov. 21, 2003

(65) Prior Publication Data

US 2004/0212834 A1 Oct. 28, 2004

Related U.S. Application Data

(60) Provisional application No. 60/428,418, filed on Nov. 22, 2002.

(51) Int. Cl.
*G06F 15/00* (2006.01)

(52) U.S. Cl.
USPC ........... 358/1.15; 358/1.1; 358/1.2; 358/1.13; 358/1.18

(58) Field of Classification Search
USPC .................. 395/114, 112; 717/176; 714/4, 56; 710/104; 358/1.13, 1.15, 1.16, 1.18, 358/402, 1.14, 114, 1.12
See application file for complete search history.

(56) References Cited

U.S. PATENT DOCUMENTS

| 5,129,639 | A | * | 7/1992 | DeHority | 270/1.01 |
|---|---|---|---|---|---|
| 5,467,434 | A | * | 11/1995 | Hower et al. | 358/1.15 |
| 6,047,110 | A | * | 4/2000 | Smith | 358/1.12 |
| 6,134,020 | A | * | 10/2000 | Masumoto et al. | 358/1.16 |
| 6,502,147 | B2 | * | 12/2002 | Reilly | 710/104 |
| 6,559,971 | B1 | * | 5/2003 | Watts et al. | 358/1.2 |
| 6,564,337 | B1 | * | 5/2003 | Yoneda et al. | 714/4 |
| 6,657,742 | B1 | * | 12/2003 | Kassmann | 358/1.15 |
| 6,731,393 | B1 | * | 5/2004 | Currans et al. | 358/1.12 |
| 6,791,702 | B2 | * | 9/2004 | Tanaka | 358/1.13 |
| 6,839,149 | B2 | * | 1/2005 | Herr | 358/1.15 |
| 6,912,061 | B1 | * | 6/2005 | Ozaki | 358/1.15 |
| 7,065,497 | B1 | * | 6/2006 | Brewster et al. | 705/14.61 |
| 7,143,150 | B1 | * | 11/2006 | Nuggehalli | 709/221 |
| 7,206,081 | B2 | * | 4/2007 | Sada et al. | 358/1.13 |
| 7,251,047 | B2 | * | 7/2007 | Meade, II | 358/1.13 |
| 7,352,487 | B2 | * | 4/2008 | Tokashiki | 358/1.18 |
| 7,362,461 | B2 | * | 4/2008 | Reddy et al. | 358/1.15 |
| 7,474,423 | B2 | * | 1/2009 | Garcia et al. | 358/1.15 |

(Continued)

*Primary Examiner* — Allen H Nguyen
(74) *Attorney, Agent, or Firm* — Pearne & Gordon LLP

(57) ABSTRACT

A multi-media printer renders an image from a submitted print job. A decoding module receives the submitted print job and extracts a print client indicator from the submitted print job. A mapping module includes a plurality of entries, each of the plurality of entries including the print client indicator and a corresponding job settings file. A parameter determination module receives the at least one print client indicator and compares the print client indicator to the plurality of entries in the mapping module to determine if a matching entry corresponds to print client indicator. The parameter determination module determines if the corresponding job settings file in the matching entry includes at least one media selection parameter. The parameter determination module outputs at least one media selection parameter as one of the final media selection parameters if the corresponding job settings file in the matching entry is found in the mapping module and the media selection parameters are defined and operational.

39 Claims, 8 Drawing Sheets

(56) References Cited

U.S. PATENT DOCUMENTS

| | | | |
|---|---|---|---|
| 7,502,137 B2 * | 3/2009 | Morales et al. | 358/1.18 |
| 7,505,921 B1 * | 3/2009 | Lukas et al. | 705/26 |
| 2001/0056494 A1 * | 12/2001 | Trabelsi | 709/229 |
| 2002/0046312 A1 * | 4/2002 | Nakamura | 710/301 |
| 2002/0062364 A1 * | 5/2002 | Watanabe | 709/223 |
| 2003/0002081 A1 * | 1/2003 | Leone et al. | 358/1.18 |
| 2003/0151762 A1 * | 8/2003 | Cherry et al. | 358/1.14 |
| 2003/0226139 A1 * | 12/2003 | Lee | 717/176 |
| 2004/0100651 A1 * | 5/2004 | Leone et al. | 358/1.15 |
| 2004/0249975 A1 * | 12/2004 | Tuck et al. | 709/245 |

* cited by examiner

| Print Client Indicator | Job Settings File (contents of file) |
|---|---|
| CTImages (AE Title) | CTImages file (background, coverage, Dmin, and Dmax parameters) |
| PACImages (AETitle) | PACImages file (blue film, receive tray, captions, Dmin, and image warnings parameters) |
| NMImages (AETitle) | NMImages file (clear film, 11 x 14 size, antialias parameters |
| MRImage (AETitle) | MRImage file (contrast enhancement, gamma correction, medical color management and polarity parameters) |

Fig. 6(a)

| Print Client Indicator | Media Selection Parameters |
| --- | --- |
| Destination IP address 192.168.100.1 | Blue Film; 11 x 14 media size |
| Destination IP address 192.168.100.4 | Grayscale paper; A4 media size |
| Destination IP address 192.168.100.12 | Clear Film; 14 x 17 media size |
| Destination IP address 192.168.100.16 | Color paper; A media size |

Fig. 6(b)

| Text Attribute | Port Client Username | TCP Port Number | Destination IP Address | Source IP Address | Priority | Media Selection Parameters |
|---|---|---|---|---|---|---|
| BF1114 | CT11 | 104 | 192.168.100.1 | 192.168.100.2 | 1 | Blue Film; 11 x 14 |
| BF1114 | CT11 | | 192.168.100.1 | 192.168.100.2 | 2 | Blue Film; 14 x 17 |
| BF1114 | CT11 | | 192.168.100.1 | | 3 | Blue Film; 11 x 14 |
| GPA | CT | 104 | | | 4 | Grayscale Paper; A Size |
| GPA | CT | | 192.168.100.2 | | 5 | Grayscale Paper; A4 Size |
| | MRI11 | | | | 6 | Film; A4 Size |
| | | | 192.168.100.1 | | 7 | Film; 11 x 17 Size |
| | | | | | | |

Fig. 6(c)

MEDIA SELECTION METHODS IN A MULTI-MEDIA PRINTER UTILIZING PRINT CLIENT INDICATORS

RELATED APPLICATIONS

This application claims priority from a provisional application, U.S. provisional patent application Ser. No. 60/428,418, filed Nov. 22, 2003.

BACKGROUND OF THE INVENTION

Health care organizations, such as hospitals, clinics, and offices, have computer networks which allow the transfer of digital medical images from one location to another. An exemplary medical imaging network may include digital radiography devices, a Picture Archive and Communication System (PACS) device, a Computed Radiography (CR) device, an Ultrasound device, a Computed Tomography (CT) device, a Magnetic Resonance Imaging (MRI) device, a Nuclear Medicine (NM) device, a Digital Radiography (DR) device, a mammography device, an angiography device, a Positron Emission Tomography (PET) scanning device, or other digital imaging devices. This list of medical imaging devices is merely illustrative and not exhaustive. Also installed on the medical imaging network is a multi-media printer which produces or creates print jobs generated by a print client on the medical imaging devices. The multi-media printer allows printing on film-based media along with printing on paper media. Medical professionals, in many cases, are still familiar with a wet-film process where an image is exposed on film and the film is processed to provide a display. Therefore, the multi-media printers produce images which have a similar appearance and function to the images produced by the wet-film process.

The multi-media printer may include a combination of printing technologies. The printing technologies include, laser-toner, laser-photothermographic, ink-jet, direct thermal, or dye-diffusion printing technologies. This list is merely illustrative and not exhaustive. In direct thermal printing, media having a thermal responsive surface is brought into contact with the printhead and translated over the printhead. When the media is translated over the printhead, thermal elements on a linear array are selectively heated to form pixels on the media which correspond to pixels in the desired image. In the dye-diffusion process, a donor ribbon and receiver media are translated together over the printhead, the donor ribbon being between the printhead and the receiver media. While the donor ribbon and receiver media are translated over the printhead, the individual thermal elements on the linear array are selectively heated to transfer dye from the donor ribbon to the receiver media to form pixels corresponding to pixels in a desired image.

The multi-media printers are capable of printing on a variety of media types, e.g., paper and film, and also on a variety of media sizes, e.g., A-size, A4-size, 8×10 inch, 11×14 inch, 10×14 inch, 11×17 inch, and 14×17 inch. Multi-media printers also are capable of supporting color-specific media and grayscale-specific media of a given type, i.e., color paper and grayscale paper. The plurality of options available for each incoming print job requires a method to be established within the multi-media printer for selecting a specific media for each incoming print job. When dye-diffusion printing technologies are utilized, the multi-media printer is capable of printing on media sizes 8×10 inch, 11×17 inch, A, and A4. If direct thermal print technologies are utilized, the multi-media printer is capable of printing on all of the above-mentioned media sizes.

Traditionally, media-type and/or media size attributes are specified in parameters included within a print job. A print job is transmitted to the multi-media printer utilizing a communication mechanism. The communication mechanism includes a physical layer, an optional transport layer, and an optional application layer. The physical layer protocols may include, but are not limited to, Ethernet, Token Ring, Universal Serial Bus, Parallel (Centronics, etc.), Fiber Optic, and Wireless technologies (802.11, and other WiFi technologies). The transport layer protocols may include, but are not limited to, TCP/IP, AppleTalk™, and raw binary. The application layer protocols include, but are not limited to, FTP, LPR, Printer Access Protocol (PAP), DICOM, and SMB, which is a Microsoft Windows™ network protocol.

The print job could be comprised of PostScript commands and data. Alternatively, the print job may include DICOM Information Object Descriptions (IODs) and data. Alternatively, the print job may just include image data in various file formats such as TIFF, GIF, JPEG, PNG, etc. In another alternative, the print job may include EP Raster commands and data, a Codonics specific format. In another alternative, a print job includes VMF/FMF control commands, also a Codonics specific format.

The print job includes job parameters, sheet parameters, and image parameters. The print parameters specifies how the print job is printed at the multi-media imager. Job parameters may include, but are not limited to, media type, media size, receive tray, and priority. Sheet parameters may include, but are not limited to, background, border fill, captions, coverage, Dmax (maximum optical density), Dmin (minimum optical density), film view, image warnings, and look up tables (LUTs). Image parameters may include, but are not limited to, antialias, contrast enhancement, gamma correction, medical color management, polarity, rotate, saturation, and scaling.

For example, a print job utilizing the PostScript protocol may include a job parameter known as "Paper Size" to indicate the media size for the print job, and another job parameter known as "Paper Source" to indirectly indicate the media type. Illustratively, a print job transmitted utilizing the Digital Imaging and Communications in Medicine (DICOM) print protocol may include a print job parameter known as "Film Size ID", indicating the media size for the submitted print job, and another print job parameter known as "Medium Type" indicating the media type for the submitted print job.

A print client is the device that submits the print job to the multi-media printer. The print client may be resident within a medical imaging device or a computing device. The multi-media printer has a plurality of media size and media type values available to be utilized in creating images or prints based on the submitted print jobs. Under certain operating conditions, the print client may submit print jobs including job parameters, such as media type and media size, that are supported by the multi-media printer. The print client may select these job media selection parameters utilizing menus in a graphical user interface, or alternatively, via parameters in a configuration file located on the medical imaging device or the computing device.

Under other operating conditions, the print client may not have the capability to submit jobs to utilize all of the plurality of media type and media size job parameters. Under other operating conditions, the print client may not submit media type or media size print parameters at all. For example, in the DICOM protocol, "Film Size ID" and "Medium Type" are optional parameters, which the print client may or may not utilize. Other print job submission protocols, such as Line Printer Remote (LPR) or File Transfer Protocol (FTP), do not define methods for media selection parameters at all. Under these operating conditions, the multi-media printer may receive no job parameters for media size and media type or only partial job parameters, i.e., only one of media size and media type job parameters.

In response to these operating conditions, the multi-media printer may reject the print job as being incomplete or in error, meaning that no media is selected by the multi-media printer for the print job. In many cases, this is not a useful result for the print client.

Another alternative in responding to these operating conditions is to default to the currently loaded media. This option is also not desirable because multiple media types or media sizes may be loaded, or the multi-media printer may be out of media. This alternative also requires that the user verify that the proper media is loaded prior to submitting the print job. This can be very inconvenient if a networked multi-media printer is not proximate to the print client system that submitted the print job.

Another alternative in responding to these operating conditions is to utilize a predetermined nonconfigurable default that is used when the previously mentioned media selections methods fail. This guarantees that the print job is queued, however, the submitting print client has no method for selecting or changing the default media setting. In addition, the networked imaging system may not allow the altering or changing of the media selections at all or may require altering the media selections through the use of a diagnostic function or an administrative function that the user may not have access to. Both of these options make it impossible, or at least inconvenient, for the print client user to change or modify the media selection for the submitted print jobs Under other operating conditions, the print client, whether it is resident on a computing device or a medical imaging device, may not be allowed to select all of the possible media selection options that are available or configured at the multi-media printer. For example, media sizes A and A4 are generally desktop publishing sizes which medical imaging devices do not normally support. Accordingly, many medical imaging devices may not support the selection of media sizes A and A4 because they typically utilize media with sizes of 8×10, 11×14, or 14×17 inches.

Therefore, it may be desirable for a user, e.g., a print client, to have the capability of establishing a variety of media settings when the print media selection parameters cannot be explicitly or directly controlled by the print client specifying media selection parameters by the print client in a print job, e.g., using application parameters. It may be desirable for the multi-media printer to be able to utilize existing information in the communication between the print client (resident in the medical imaging device or the computing device) and the multi-media printer, e.g., such as network identity address, a TCP port number, a modality, or a text attribute. Illustratively, the text attribute may include a print client username, a print client host IP name, a DICOM application entity (AE) title, a source file name, a destination file name, a destination directory name, a password, a queue name, a logical device name, an AppleTalk™ ID, or any free form text attribute field not normally intended to specify media selection. The list of free form text attributes is illustrative and not exhaustive.

DETAILED DESCRIPTION OF THE DRAWINGS

FIG. 6(a) illustrates a table including entries with print client indicators and job settings files according to an embodiment of the present invention;

FIG. 6(b) illustrates a table including entries with print client indicators and media selection parameters according to an embodiment of the present invention; and FIG. 6(c) illustrates a print client identifier section of a mapping table including priority designations according to an embodiment of the present invention.

DETAILED DESCRIPTION

Figure 1:
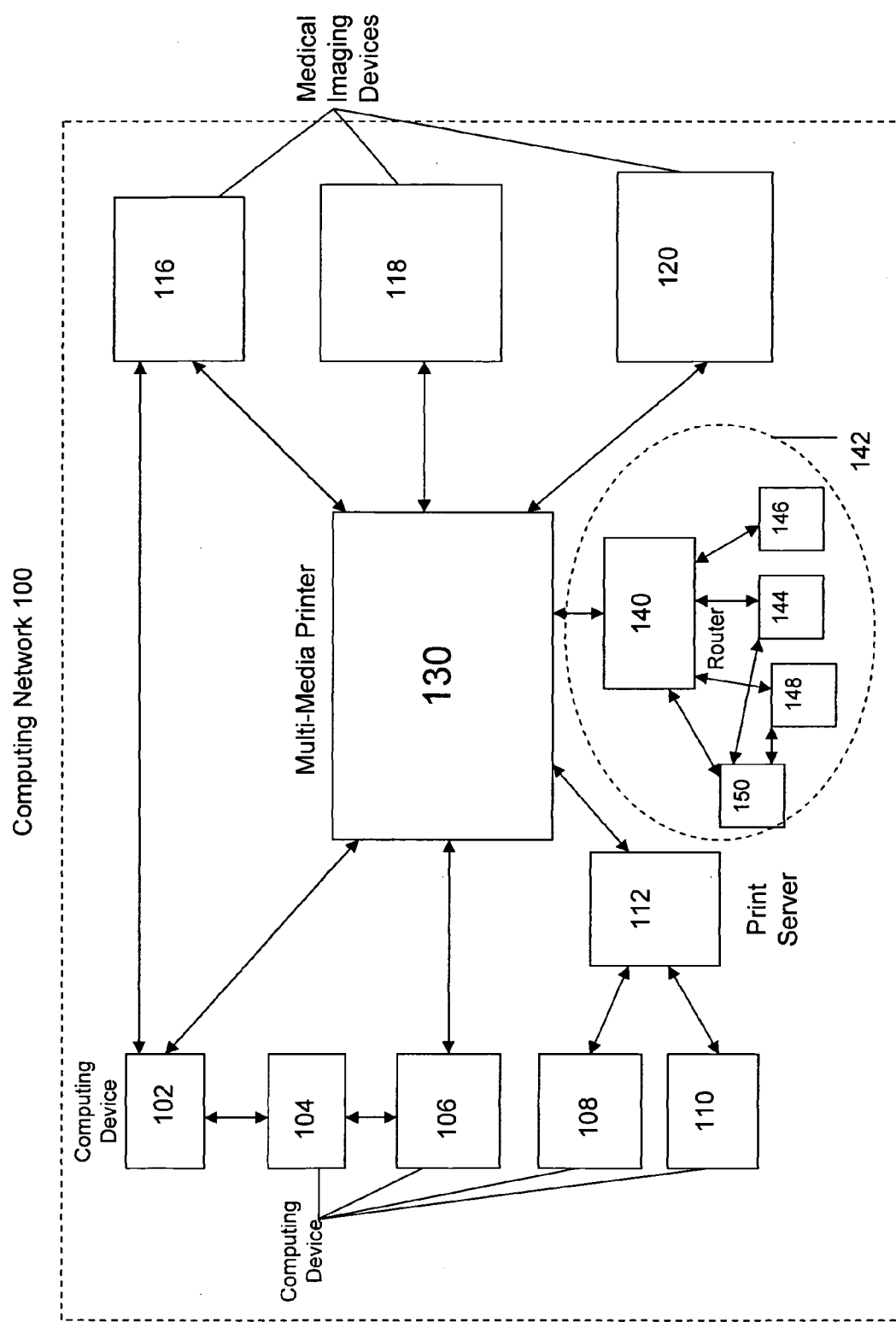
FIG. 1 illustrates transmission paths in a computing network from computing devices and medical imaging devices to a multi-media printer according to an embodiment of the present invention.

FIG. 1 illustrates transmission paths in a computing network from computing devices and medical imaging devices to a multi-media printer according to an embodiment of the present invention. A computing network 100 may include a plurality of computing devices 102, 104, 106, 108, and 110, a plurality of medical imaging devices 116, 118, and 120, and at least one multi-media printer 130. The computing network 100 may include a plurality of multi-media printers. For simplicity, only one multi-media printer is illustrated in FIG. 1. The computing network 100 may also include a router 140 which couples a subnetwork 142 to the computing network 100. The subnetwork 142 may include a plurality of computing devices 144 and 146 and a plurality of medical imaging devices 148 and 150. The computing network 100 may be a local area network or a wide area network. Alternatively, the computing devices and medical imaging devices may be coupled to the multi-media printer 130 via a global communications network, i.e., the Internet. The communication network 100 may be transmitting data according to a variety of communication mediums. The plurality of computing devices 102, 104, 106, 108, and 110, may communicate directly with the plurality of medical imaging devices 116, 118, and 120. The communication medium may include physical layer connections such as Ethernet, Token Ring, USB, parallel communications, fiber optic communications, and wireless communications.

The multi-media printer 130 prints graphic images or text documents transmitted from the plurality of computing devices, e.g., devices 102, 104, 106, 108, and 110. In one embodiment of the invention, the graphic images or text documents may be first transmitted to another computing device, e.g., from computing device 104 to 102 and then to the multi-media imager 130. In another embodiment of the present invention, the graphics images or text documents may be first transmitted to a print server 112 which then transmits the documents to the multi-media printer 130. The multi-media printer 130 prints medical images transmitted from the plurality of medical imaging devices 116, 118, and 120. In an embodiment of the invention, a PACS workstation may receive graphic images or text documents from multiple medical imaging and computing devices and may then transmit the graphics images or text documents to the multi-media printer 130. In an embodiment of the invention, the PACS workstation or a device functioning in a similar fashion to the PACS workstation may poll the medical imaging devices, e.g., 116, 118, or 120, to determine if any graphics images or text documents need to be transmitted to the multi-media printer 130. In an additional embodiment of the invention, a print job submitted from a first print client may require images to be retrieved from another medical imaging device, e.g., a file server, a database server, or a MRI. In this embodiment of the invention, the multi-media printer 130 may receive the print job from the first print client and send a request to the other medical imaging device storing the necessary images in order to print the graphic images and text documents. This may be referred to as "a pulled print" or "pulling images."

In an embodiment of the invention, the multi-media printer may support multiple printing requests from the plurality of medical devices 116, 118, and 120 utilizing a variety of protocols. The multi-media printer 130 may also support multiple printing requests from the plurality of computing devices 102, 104, 106, 108, and 110 utilizing a variety of protocols. The plurality of protocols may include the DICOM protocol, the PostScript protocol, the FTP protocol, the LPR protocol, or the PAP protocol.

The medical imaging devices 116, 118 and 120, and the computing devices 102, 104, 106, 108, and 110 transmit print jobs which may include a plurality of print parameters and print job data. The print job may also be referred to as a print operation. The plurality of print parameters may include job parameters, sheet parameters, and image parameters. The plurality of medical imaging devices 116, 118, and 120 may be Digital Radiography (DR) devices, a Picture Archive and Communication System (PACS) device, a Computed Radiography (CR) device, an Ultrasound device, a Computed Tomography (CT) device, a Magnetic Resonance Imaging (MRI) device, a Nuclear Medicine (NM) device, a Digital Radiography (DR) device, a mammography device, an angiography device, a Positron Emission Tomography (PET) scanning device, or other digital imaging devices. The medical imaging devices 116, 118, and 120 may transmit print jobs utilizing the DICOM protocol.

The plurality of computing devices 102, 104, 106, 108, and 110 may be laptop computers, personal digital assistants, cellular phones, desktop computers, or other devices able to create print jobs.

The multi-media printer 130 may be able to print images on a variety of media including paper and film. The multi-media printer 130 may also be able to print on a variety of media sizes, e.g., A-size, A4-size, 8×10 inch, 10×14 inch, 11×14 inch, 11×17 inch, 14×17 inch. Illustratively, the multi-media printer 130 may be able to print on blue film and clear film, such a DirectVista® manufactured by Codonics, Inc, of Middleburg Heights, Ohio. The multi-media printer 130 may be able to print on grayscale paper, such as DirectVista® Grayscale Paper, distributed by Codonics, Inc. The multi-media printer 130 may also be able to print on ChromaVista® Color Paper or Film, distributed by Codonics, Inc.

The multi-media printer 130 may include default parameters, e.g., default job parameters, default sheet parameters, and default image parameters. In the default job parameters, default media selection configurations may be employed for the multi-media printer 130. The default media selection configurations may be stored in a non-volatile configuration memory. The default media selection configurations are not programmable or configurable and may be modified or changed by a user at the multi-media printer 130 or, alternatively, by the print client. The default media selection configurations may be also referred to as default media selection parameters. The default media selection configurations may be alterable via a control panel on the multi-media printer 130. The default media selection configurations may be alterable via user instructions from a properly authenticated computing device 102, 104, 106, 108, and 110 or medical imaging device 116, 118 and 120. This allows the alterability of the default media configurations when other media selection methods are insufficient or inapplicable, or when other media selection methods are purposefully disabled. One of the default media selection configurations is normally utilized when any or all other media selection methods fail. Further discussion of the availability of default media selections is provided in the following patent application, the disclosure of which is incorporated herein by reference, application Ser. No. 12/719,745, entitled "Default Media Selection Methods in a Multi-Media Printer," filed herewith."

The media selection parameters may also be utilized in conjunction with a sheet parameter such as the coverage parameter. The coverage parameter or attribute may allow the print job to specify the particular area of the sheet to be used for rendering the print data of the print job. The coverage parameter or attribute may be included in the default parameters for the multi-media printer 130. Illustratively, the print job parameters may include standard coverage (print with ¼" or 1" margins) or "full-bleed" coverage mode (print on entire physical sheet). If the media type selected is a paper media type, the "full-bleed" coverage allows an image to go to close to or off of the edge of the page to allow additional printing space. If the media type selected is film, the normal printing on film is an edge which has blackened borders. If the "full-bleed" coverage is selected, the image may be scaled larger on the film, but the blackened border may be lost.

When the multi-media printer 130 receives a print job from a print client, the multi-media printer 130 goes through a predetermined sequence of job, sheet, and image parameters sources to determine the final print job parameters, including the final media selection parameters. The pre-determined sequence may be referred to as the media selection hierarchy. The multi-media printer 130 may determine if a print client indicator references a job settings file, where the job settings file may include media selection parameters. The job settings file may be pre-existing in the multi-media printer 130. Under certain operating conditions, a job settings file may be created prior to the print job being transmitted by a privileged print client, e.g., a system administrator. To determine if the print client indicator references a job settings file, the multi-media printer 130 compares the print client indicator, e.g., a text attribute, to a list of job settings files. If a matching entry is found in the list of job settings files, the parameters contained in the job settings files are utilized by the print job. The parameters contained in the job settings file may include media selection parameters.

The print client indicator may also directly map to media selection parameters. The multi-media printer 130 may receive the print client indicator and compare the print client indicator, utilizing a mapping module, to a list of print client indicator entries. The list of print client indicator entries includes a plurality of print client indicators and corresponding media selection parameters. If a matching entry is found in the list of print client indicator entries, the media selection parameters stored in the matching entry are utilized. For example, the print client indicators may include a network identity, a TCP port number, a modality, and a text attribute.

If the print client indicators are not utilized to select media selection parameters, the multi-media printer 130 may utilize application specified parameters to determine the media selection parameters. Illustratively, application specified parameters may include DICOM print session information, standard parameters from a PostScript file, or multi-media printer parameters in the form of DSC comments from a PostScript file. If the print client indicators and the application specified parameters do not select the necessary media selection parameters, then default media settings, discussed above, may be utilized to select the media selection parameters. Default media settings, by definition, are always operational and defined; the multi-media printer will ensure that default media settings are always defined and that only operational media parameters are configured.

Application specified parameters are typically used for media selection; however configuring application specified parameters for the desired media selection is not always possible or practical as described above. In such cases, print client indicators may be used to facilitate the desired media selection. The media selection parameters specified by utilizing print client indicators are checked to determine if they are operational and defined. If the parameters are operational and defined, they are configured as the final media selection parameters. If one of the media selection parameters selected utilizing the print client indicators is not operational or defined, the application specified media selection parameters and default media settings may be used to supplement the media selection parameters. In other words, media selection parameters are applied hierarchically as follows: Media selection parameters specified by default media settings are superseded by defined and operational application specified media selection parameters which are superseded by defined and operational print client indicator specified media selection parameters.

In an embodiment of the invention, the multi-media printer 130 may be able to identify the media selection because of the use of a text attribute within the information transmitted by the print client. As discussed above, the multi-media printer 130 may utilize the text attribute to perform a search of a list of job settings files in the multi-media printer. If the multi-media printer 130 finds a match between the text attribute and one of the job settings filenames, parameters stored in the matching job settings file are selected by the multi-media printer 130. The text attribute may be a text phrase, a code, an acronym, or any other recognizable character and numerical representation. In an embodiment of the invention, the text attribute may not allow any whitespace. The print client (resident on the medical imaging device or the computing device) and the multi-media printer 130 are configured to know where to transmit the text attribute and where to look for the text attribute, respectively. In other words, a field that is known by both the print client and the multi-media printer includes a text attribute that selects a job settings file.

The text attribute may be a username, a password, an AppleTalk™ ID, a queue device name, a logical device name, a source file name, a destination file name, a destination directory name, a DICOM AE title, a source IP address alias, a destination IP address alias, or any other free form text field not normally intended for media selection. Illustratively, a text attribute of "ColorA4" may match a job settings file entitled ColorA4.jsf. The job settings file ColorA4.jsf may include media selection parameters of color paper and A4-size media along with a Dmin parameter and a full-bleed sheet parameter. In this example, the media selection parameters are media type of color paper and media size of A4.

The job settings file selected utilizing the text attribute may not include media selection parameters. If the job settings file does not include media selection parameters, then the hierarchy of selecting media selection parameters discussed above is utilized.

In an embodiment of the invention, the multi-media printer 130 may be able to determine the media selection parameters based on the transmission control protocol (TCP) port on which the print job is received. In this embodiment of the invention, the print client uses an initiating port to make a request for a secondary TCP port from the multi-media printer 130. The multi-media printer 130 provides the secondary TCP port to the print client. The print client transmits the print job to the multi-media printer 130 utilizing the secondary TCP port. The multi-media printer 130 may extract the initiating TCP port information provided in the request. When the multi-media printer 130 receives the print job at the TCP port, the print job is modified to identify that it was initiated on the initiating TCP port. In an embodiment of the invention, this information is added to the print job. The print job, i.e., the plurality of print parameters and the print job data, are decoded in the multi-media printer 130. The multi-media printer receives the TCP port information, accesses the mapping table, and determines the final media selection parameters for the submitted print job from the mapping table.

In an embodiment of the invention, the multi-media printer 130 may be able to determine the media selection parameters based on the network identity included in the print job. The identity network may be an IP address or a MAC address, but is not limited to these addresses. The network identity may be a source network identity or a destination network identity. Illustratively, if the network identity is an IP address, the IP address may be either the source IP address or the destination IP address. Illustratively, if the network identity is a MAC address, the MAC address may either be a source MAC address or a destination MAC address.

The next example utilizes IP addresses, but MAC addresses may also be utilized. Under operating conditions utilizing an IP address, the source IP address identifies the medical imaging device or the computing device that submitted the print job. The destination IP address identifies the multi-media printer 130 that is to receive the submitted print job. Under these operating conditions, entries in the mapping module may be established for the IP addresses. In other words, the mapping module may include entries with one column listing IP addresses and the other column listing corresponding media selection parameters for the IP addresses. If the destination IP address is utilized, multiple destination IP addresses may be utilized for a single multi-media printer 130. This process is named "IP aliasing" and allows multiple destination IP addresses to be established for each multi-media printer 130, with each of the multiple destination IP addresses having unique media selection parameters.

In this embodiment of the invention utilizing IP addresses, a print job is submitted from a print client. Due to the protocol being utilized, the print job includes a source IP address and a destination IP address. The multi-media printer 130 receives the print job including the source IP address, the destination IP address, the plurality of print parameters, and the print job data. The multi-media printer 130 decodes the plurality of print parameters and the print job data and extracts the source IP address and/or the destination IP address. Depending upon the configuration of the multi-media printer 130, the printer 130 may compare the source IP address to the mapping module, retrieve the corresponding media selection parameters for the source IP address, and transmit the corresponding media selection parameters as the final media selection parameters. In addition, the printer 130 may compare the destination IP address to the mapping module, retrieve the corresponding media selection parameters for the destination IP address, and transmit the corresponding media selection parameters as the final media selection parameters for the print job. The printer 130 may also compare both the source IP address and the destination IP address to the mapping module, retrieve the corresponding media selection parameters for the pair of the source IP address and the destination IP address, and transmit the corresponding media selection parameters as the final media selection parameters for the print job.

In an embodiment of the invention, the multi-media printer 130 may be able to determine the media selection parameters based on a modality that submitted the print job. In this embodiment of the invention, the print client makes a request for a connection from the multi-media printer 130. The request may include a modality indicator identifying the device that submitted the print job. The multi-media printer 130 may extract the modality indicator provided in the request. The multi-media printer 130 transmits a connection authorization to the print client. The print client transmits the print job to the multi-media printer 130. When the multi-media printer 130 receives the print job, the print job is modified to identify that it was submitted from a specific modality. In an embodiment of the invention, this information is added to the print job. The print job, i.e., the plurality of print parameters and the print job data, are decoded in the multi-media printer 130. The multi-media printer receives the modality information, accesses the mapping module, and determines the final media selection parameters for the submitted print job from the mapping module.

In an embodiment of the invention, the multi-media printer 130 may be able to determine the final media selection parameters by utilizing a combination of the above-mentioned TCP port number, text attribute, network identity, and a modality indicator. The TCP port number, text attribute, network identity, and the modality indicator may all be referred to as the print client indicators. In other words, the multi-media printer 130 may utilize two or more of the print client indicators to determine the final media selection parameters. The multimedia printer 130 may extract the combination of print client indicators from the decoded plurality of print parameters and/or the print job data. The combination of print client indicators is then compared to entries in the mapping module to find a matching entry. The matching entry may have the combination of print client indicators in one column and corresponding media selection parameters in a second column.

Illustratively, the multi-media printer 130 may decode the plurality of print parameters and print job data and extract a source IP address of 192.168.100.1, and a username of Ultrasound2. The combination of IP address 192.168.100.1 and username Ultrasound2 is compared to the mapping module and a matching entry may be located. The located matching entry has a column with print client identifiers 192.168.100.1 and Ultrasound2 and corresponding media selection parameters of blue film (media type) and 11×14 (media size).

The plurality of different print client indicators may be utilized in various combinations. Under certain operating conditions, five client indicators, e.g., text attribute, TCP port, destination network identity, source network identity, and modality may be utilized. Under other operating conditions, more than five print client indicators may be utilized especially if multiple text attributes are utilized. Illustratively, the multi-media printer 130 may extract a text attribute, a print client username, a destination network identity, and a source network identity from the incoming print job. Under certain operating conditions, each of the single print client indicators may have an entry in the mapping module. If a priority scheme is not determined for mapping module entries, the multi-media printer 130 may identify multiple sets of media selection parameters. Thus, in an embodiment of the invention, a priority may be established for the print client indicators stored in the mapping module. In an embodiment of the invention, the priority of the mapping table may be established as 1) if five print client indicators are extracted and a matching entry is located in the mapping module, that entry has the highest priority; 2) if five print client indicators are extracted and a matching entry is located for four of the values, that entry has the second highest priority; 3) if four print client indicators are extracted and a matching entry is located in the mapping module, this entry has the third highest priority, etc. This priority determination may be established for all entries down the level where only a single print client indicator is extracted and the different print client indicator has different priorities. For example, if the single print client indicator is extracted, the source network identity has a higher priority than the destination network identity. The destination network identity in turn has a higher priority than the modality indicator. The modality indicator has a higher priority than the text attribute, e.g., user password. The password in turn has a higher priority than the TCP port number. Thus, in this embodiment of the invention, each of the entries in the mapping table may have a priority associated with it. The priority may be established based on a priority indicator filed in the mapping table, or alternatively, by the location of the entry in the mapping table, i.e., the first entry in the mapping table has the highest priority.

Figure 2:
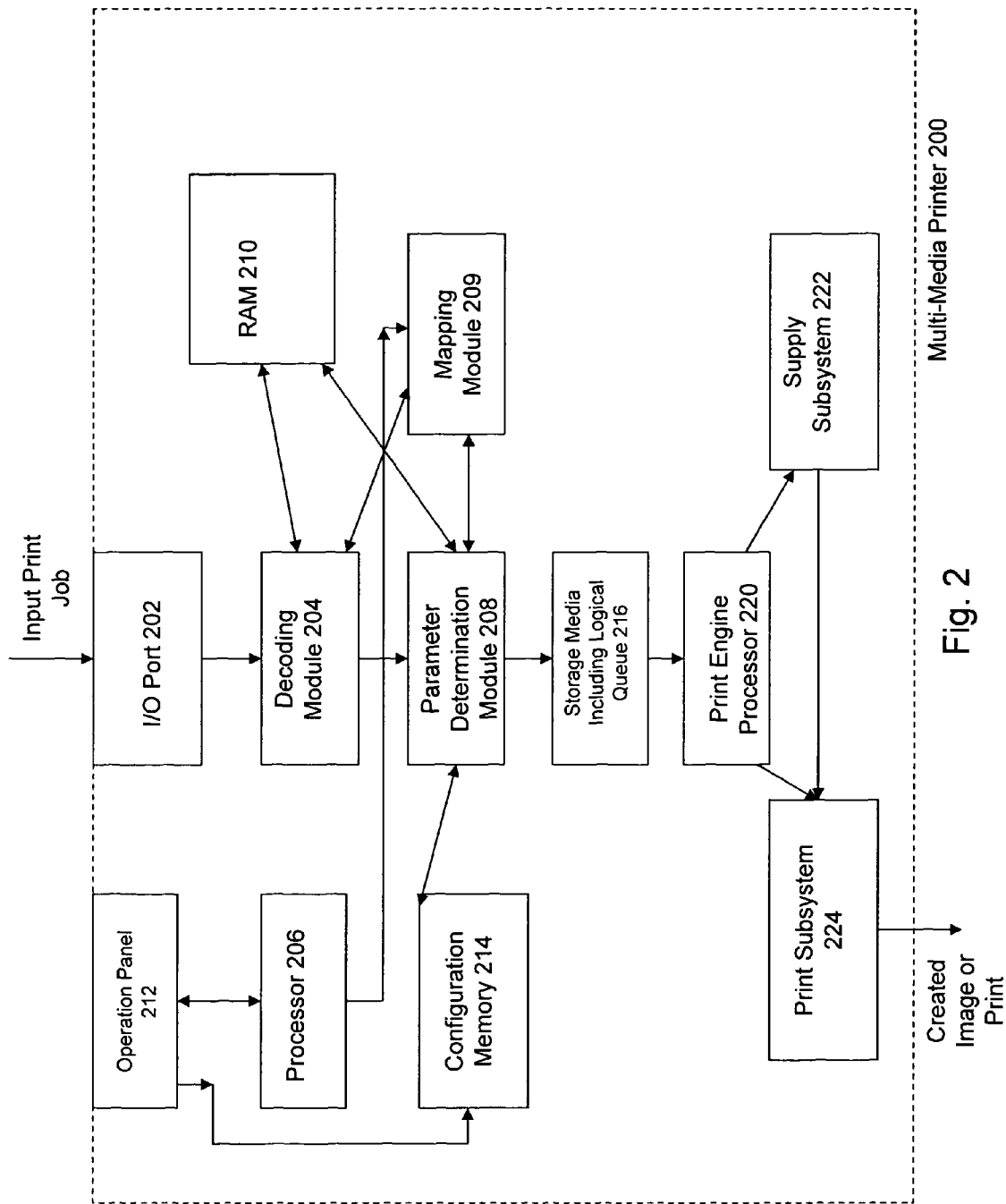
FIG. 2 illustrates a multi-media printer utilizing print client indicators to determine media selection parameters according to an embodiment of the present invention.

FIG. 2 illustrates a multi-media printer utilizing default media selection parameters according to an embodiment of the present invention. The multi-media printer 200 may include an input/output port 202, a decoding module 204, a parameter determination module 208, a processor 206, a mapping module 209, a random access memory 210, an operation panel 212, a configuration memory 214, a non-volatile storage device 216 including a logical queue. The multi-media printer 200 may also include a print engine processor 220, a supply subsystem 222, and a print subsystem 224.

In an embodiment of the invention, the input/output port 202 may receive an initial print connection request (e.g., TCP port request, etc.) from a print client. The input/output port 202 may transmit a response allowing or enabling a print connection request. In an embodiment of the invention, the input/output port 202 may communicate with the processor 206 to determine if a print connection request is enabled or allowed. The input/output port 202 may also transmit the print connection request to the decoding module 204. The decoding module 204 may extract a print client indicator from the print connection request. The decoding module 204 may extract a plurality or combination of print client indicators, as detailed above, but for simplicity only a single print client indicator is discussed. The print client indicator may be a TCP port number, a network identity, a modality, or a text attribute, etc. The print client indicator may be stored for later use by the multi-media printer 200. Illustratively, the print client indicator may be stored in the random access memory 210 or the decoding module 204.

A mapping module 209 may be originally configured within the multi-media printer 130. The mapping module 209 may be physically located in the RAM 210, a mass storage device 216, or the configuration memory 214. Alternatively, the mapping module 209 may be physically located in a separate physical memory device, as illustrated in FIG. 2.

The mapping module 209 may include a table having print client indicator entries. In one embodiment of the invention, the table of the mapping module 209 may include a plurality of entries, the plurality of entries each having a field listing print client indicators and a corresponding field listing job settings files. Illustratively, the print client indicators could be 1) text attributes; 2) network identities, TCP port numbers, and/or modalities; and 3) a combination of text attributes and network identities, TCP port numbers, and/or modalities.

Illustratively, if the print client indicator is an AE Title "mysettings," and the mapping module includes an entry with mysettings in one field and the job settings file "mysettings.jsf" in another field. Under certain operating conditions, the job settings file may include media selection parameters. Under certain operating conditions, the job settings file may not include media selection parameters.

In an embodiment of the invention, the table within the mapping module 209 may include a plurality of entries, the plurality of entries each having a field listing print client indicators and a corresponding field listing media selection parameters. This table is more a direct mapping to media selection parameters. Illustratively, as above, the print client indicators could be 1) text attributes; 2) network identities, TCP port numbers, and/or modalities; and 3) a combination of text attributes and network identities, TCP port numbers, and/or modalities. Illustratively, if the print client indicator is a network identity, an entry in the mapping table 209 may include an IP address and its associated media selection parameter(s).

In an embodiment of the invention, the mapping module 209 may be loaded from a portable memory such as a memory stick, a memory card, or other removable memory. In this embodiment, the portable memory may create a new table within the mapping module, may add new entries to the table within the mapping module 209, or may edit current entries within the mapping module 209. In an embodiment of the invention, the mapping table 209 may be created or edited by utilizing the operation panel 212. In an embodiment of the invention, a removable memory may be present the multimedia printer including files which have pre-determined formats. In an embodiment of the invention, a print client may transmit a command including updates to the mapping table 209. In an embodiment of the invention, an administrator of a network or subnetwork may login to the multi-media printer and edit the mapping table 209.

Next, the input/output port 202 receives a print job from a medical imaging device or a computing device via the communications network. The input/output port 202 is a digital input/output port. The print job or print operation includes a plurality of print parameters and print job data. Under certain operating conditions, the plurality of print parameters may include job parameters, sheet parameters, and image parameters. The job parameters include media selection parameters. Under other operating conditions, the job parameters may not include media selection parameters. The media selection parameters may include, but are not limited, to media type parameters and media size parameters. In other words, the job parameters for the print job may not include media type or media size parameters. The print job including the plurality of print parameters and the print job data are transmitted by the medical imaging device 116, 118, or 120 (see FIG. 1) or computing device 102, 104, 106, 108, and 110 (see FIG. 1) according to a communications protocol. Illustratively, the communication protocols may include application layer protocols such as FTP, LPR, PAP, DICOM, or SMB. The communications protocols may include transport layer protocols such as TCP/IP, AppleTalk™, or a raw binary format. The communication medium may include physical layer connections such as Ethernet, Token Ring, USB, parallel communications, fiber optic communications, and wireless communications.

The plurality of print parameters and the print job data are transferred to a decoding module 204. The decoding module 204 may be implemented in software. In an embodiment of the invention, the decoding module 204 may be implemented via a software program executed by the processor 206 and that is running in the RAM 210. In this embodiment, the software program may have been stored on a mass storage device, such as a hard disk drive or removable hard disk drive. In an embodiment, the decoding module 204 may be software stored in a READ-Only Memory (ROM), a Programmable Read-Only Memory (PROM), an ASIC, an electronically programmable read-only memory (EPROM), or an electronically erasable read-only memory (EEPROM), that is loaded by the processor 206 into RAM. The processor 206 may implement instructions stored in the decoding module 204.

The decoding module 204 receives the plurality of print parameters and the print job data, decodes the plurality of print parameters and the print job data based on the communications protocol, e.g., DICOM, Postscript, etc., and creates a decoded plurality of print parameters and decoded print job data. In an embodiment of the invention, the decoded plurality of print parameters and the decoded print job data may be stored in the RAM 210. The decoded plurality of print parameters and the decoded print job data may include a print client indicator or print client indicators. In other words, the print client indicator(s) may be located in the decoded plurality of print parameters or the decoded print job data.

In an embodiment of the invention, the print client indicator(s) may be a text attribute. The text attribute may be a code, a phrase, an acronym, or any recognizable alphabetic or numeric character string. The text attribute may be located in a field of the decoded plurality of print parameters or a field of the decoded print job data. The print client in the medical imaging device or the computing device is configured to transmit the text attribute in a specific location within the print job. The multi-media printer 130 is configured to look for the text attribute in the specific location where the print client placed the text attribute.

In the embodiment of the invention where the text attribute is the print client identifier, the parameter determination module 208 receives the decoded plurality of print parameters and the decoded print job data including the text attribute. The parameter determination module 208 may receive the text attribute from the RAM 210 or from the decoding module 204 because the decoded plurality or print parameters and the decoded print job data were stored in either location. The parameter determination module 208 may be implemented in software loaded into a mass storage device, e.g., a hard disk drive or a removable hard disk drive, where the processor loads the software into RAM and executes the software. In alternative embodiments, the software may be stored in a ROM, a PROM, an EPROM, an EEPROM, or an ASIC, as discussed previously. The parameter determination module 208 may utilize the processor 206 to execute instructions resident in the software identified above.

In this embodiment, the parameter determination module 208 receives the text attribute. The parameter determination module 208 accesses the mapping module 209. The parameter determination module 208 compares the text attribute to entries in a table in the mapping module in order to find an entry that corresponds to or matches the text attribute. If a matching entry is found that corresponds to the text attribute, the parameter determination module 208 determines if the job settings file in the matching entry includes media selection parameters. If the job settings file includes media selection parameters, the parameter determination module 208 transmits the media selection parameters located in the matching entry as the final media selection attributes for the transmitted or submitted print job. If no matching entry is found, the parameter determination module 208 determines parameters according to the media selection hierarchy, which is discussed above.

Illustratively, if the print job is communicated utilizing the DICOM protocol, a field known as "Called Application Entity (AE) Title" is utilized to identify the application to which the communication is destined. In an embodiment, this AE Title field may be 16 characters in length and may include alphanumeric characters. In this embodiment, the AE Title field has no specified form, it is considered free-form. The AE Title field is a text attribute. The print client transmits a print job and in the AE Title field includes a 6-character code, e.g., BF1114, indicating that a job settings filed named BF1114 should be selected to establish the parameters for the submitted print job. Included in the job settings file BF1114 are media selection parameters, e.g., a blue film media type and a 11×14 media size, along with a Dmax parameter, a priority parameter, a gamma correction parameter, and a polarity parameter. The multi-media printer 200 receives the print job including the plurality of print parameters and the print job data at the input/output port 202 and the decoding module 204 decodes the plurality of print parameters and the print job data according to the transmission protocol. Included in either the print parameters or the print job data is the AE Title Field, which includes the 6-character code BF1114, i.e., the text attribute. The parameter determination module 208 receives the plurality of print parameters and the print job data, including the code BF1114. The parameter determination module 208 compares the code BF1114 to the entries of the table in the mapping module 209 and determines that the BF1114 job settings file should be utilized. Thus, the corresponding media selection parameters selected are Blue Film media type and 11×14 media size. If both of these media selection parameters are defined and operational, the parameter determination module 208 transmits the media type as blue film and the media size as 11×14 as the final media selection parameters for the print job.

In an embodiment of the invention, the print client indicator(s) may be a transmission control protocol (TCP) port number. In an embodiment of the invention, the print client indicator may be the initiating TCP port number. In this embodiment, a print client requests a TCP port connection on an initiating TCP port from the multi-media printer 200. The multi-media printer 200 extracts the print client indicator, i.e., the initiating TCP port number, from the initial print connection request. In an embodiment of the invention, the decoding module 204 extracts the initiating TCP port number. In an embodiment of the invention, the parameter determination module 208 extracts the initiating TCP port number. The initiating TCP port number is associated with the print job from the print client once the print job is received by the multi-media printer 200. Under certain operating conditions, the initiating print client TCP port number is appended to the received print job before the received print job is decoded by the decoding module 204.

In the embodiment of the invention where the print client indicator is a TCP port number, the parameter determination module 208 receives the decoded plurality of print parameters and the decoded print job data including the print client indicator, i.e., TCP port number. In this embodiment, the parameter determination module 208 receives the TCP port number and utilizes the mapping module 209 to access a table within the mapping module. The parameter determination module 208 compares the TCP port number to entries in the table in the mapping module in order to find an entry that corresponds or matches the TCP port number. If a matching entry is found that corresponds to the TCP port number, the parameter determination module 208 selects the media selection parameters located in the matching entry. If the selected media selection parameters are defined and operational, the selected media selection parameters are transmitted as the final media selection parameters. If no matching entry is found, the parameter determination module 208 determines parameters according to the media selection hierarchy, which is discussed above.

Illustratively, if the print job is utilizing the TCP/IP transmission protocol, the print client may make a TCP connection request on an initiating TCP port to attempt to reserve a TCP port to which to transmit the print job. The multi-media printer 200 receives the TCP connection request and allocates a secondary TCP port for the incoming print job from the print client. The multi-media printer 200 also extracts the initiating TCP port that is allocated to the incoming print job. When the print client submits the print job at the allocated or secondary TCP port, the multi-media printer 200 may append the initiating TCP port number to the print job. The initiating TCP port number, e.g., 104, has an entry in the table in the mapping module 209. In this embodiment, the multi-media printer 200 receives the print job including the plurality of print parameters and the print job data at the secondary TCP port of the input/output port 202 and the decoding module 204 decodes the plurality of print parameters and the print job data according to the transmission protocol. Included in either the print parameters or the print job data is the initiating TCP port number 104. The parameter determination module 208 receives the plurality of print parameters and the print job data, including the TCP port number 104. The parameter determination module 208 utilizes the mapping module 209 to compare the TCP port number 104 to the entries the table in the mapping module 209 and determines the corresponding media selection parameters, i.e., grayscale paper media type and A media size. The parameter determination module 208 transmits the media type as grayscale paper and the media size as A, if both of these media selection parameters are defined and operational, as the final media selection parameters, to the storage media, e.g., hard disk 216.

In an embodiment of the invention, the print client indicator(s) may be a network identity. Illustratively, the network identity may be an IP address or a media access control (MAC) address. Under certain operating conditions, the print client indicator may be a source network identity. Under certain operating conditions, the print client indicator may be a destination network identity. In this embodiment of the invention, the print job is transmitted according to the TCP/IP protocol from the print client to the multi-media printer 200. The print job includes a plurality of print parameters, the print job data, a source network identity, and a destination network identity. Illustratively, the source network identity and the destination network identity are located in a header that encapsulates the plurality of print parameters and the print job data.

In the embodiment of the invention where the print client indicator is a destination or source IP address, the parameter determination module 208 receives the decoded plurality of print parameters and the decoded print job data including the print client identifier, i.e., destination IP address or source IP address. In this embodiment, the parameter determination module 208 extracts or de-encapsulates the source IP address or the destination IP address and utilizes the mapping module 209. The parameter determination module 208 utilizes the mapping module 209 to compare the source IP address or the destination IP address to entries in the table in the mapping module in order to find an entry that corresponds to or matches the source IP address or the destination IP address. If a matching entry is found that corresponds to the source IP address or the destination IP address, the parameter determination module 208 transmits the media selection parameters located in the matching entry as the final media selection attributes for the transmitted or submitted print job, as long as the media selection parameters are defined and operational. If no matching entry is found, the parameter determination module 208 determines parameters according to the media selection hierarchy, which is discussed above.

Illustratively, if the print job is utilizing the TCP/IP transmission protocol, a print client submits the print job to the multi-media printer 200 which receives the print job. The source IP address, e.g., 192.168.100.1, has an entry in the mapping table. In this embodiment utilizing source IP addresses, the multi-media printer 200 receives the print job including the plurality of print parameters and the print job data at the input/output port 202 and the decoding module 204 decodes the plurality of print parameters and the print job data according to the transmission protocol. In this embodiment, the source IP address 192.168.100.1 is located in a header that encapsulates the plurality of print parameters and the print job data. The parameter determination module 208 deencapsulates the source IP address 192.168.100.1 from the print job. The parameter determination module 208 compares the source IP address to the entries of the table in the matching module 209 and determines the corresponding media selection parameters, e.g., grayscale paper media type and A4 media size. The parameter determination module 208 transmits the media type as grayscale paper and the media size as A4 as the final media selection parameters (if grayscale paper and A4 media are defined and operational) to the storage media, e.g., hard disk 216.

If the multi-media printer 200 is utilizing IP aliasing, the multi-media printer may be established utilizing multiple IP addresses. In other words, the multi-media printer 130 may have multiple IP addresses setup to be utilized by the client devices. Each of the IP addresses may have unique media selection parameters established in the table in the mapping module 209. In this embodiment, the print client is selecting the media type by selecting a specific IP address. In order to utilize IP aliasing, the print client must be configured to utilize the multiple IP addresses, i.e., the multiple destination IP addresses. The configuration may occur utilizing a graphical user interface at the print client. An operator may determine the multiple IP addresses available at the multi-media printer by viewing the multiple IP addresses on the operational panel 212 of the multi-media printer 200. The multi-media printer 200 may also provide the multiple IP addresses via a status print.

In the embodiment of the invention where the print client indicator is a modality indicator, the parameter determination module 208 receives the decoded plurality of print parameters and the decoded print job data including the modality indicator. In this embodiment, the parameter determination module 208 receives the modality indicator and utilizes the mapping module 209 to accesses the table within the mapping module. The parameter determination module 208 compares the modality indicator to entries in the table in the mapping module 209 in order to find an entry that corresponds or matches the modality indicator. If a matching entry is found that corresponds to the modality indicator, the parameter determination module 208 transmits the media selection parameters located in the matching entry as the final media selection attributes for the transmitted or submitted print job if the media selection parameters are defined and operational. If no matching entry is found, the parameter determination module 208 determines parameters according to the media selection hierarchy, which is discussed above.

Illustratively, a print client requests connection to a multi-media printer and the modality of the print client is extracted from the connection request. When the print client submits the print job, the modality of the print job may be appended to the print job. The modality, e.g., mammography, has an entry in the table in the mapping module 209. In this embodiment, the multi-media printer 200 receives the print job including the plurality of print parameters and the print job data at the input/output port 202 and the decoding module 204 decodes the plurality of print parameters and the print job data according to the transmission protocol. Included in either the print parameters or the print job data is the modality indicator, MAMMO. The parameter determination module 208 receives the plurality of print parameters and the print job data, including the modality indicator MAMMO. The parameter determination module 208 compares the modality indicator MAMMO to the entries of the table utilizing the mapping module 209 and determines the corresponding media selection parameters, e.g., blue film media type and 8×10 media size. The parameter determination module 208 transmits the media type as blue film and the media size as 8×10 as the final media selection parameters to the storage media 216.

In an embodiment of the invention, the parameter determination module 208 receives the decoded plurality of print parameters and the print job data including a combination of print client indicators. The combination of print client indicators may be at least two of a network identities (source or destination network identities), a TCP port number, a modality indicator, and a text attribute. The parameter determination module 208 extracts or retrieves the combination of print client indicators. The parameter determination module 208 compares the combination of print client indicators utilizing the mapping module with entries in the table in the mapping module 209 to determine if a matching entry exists for the combination of print client indicators. In this embodiment of the invention, the entries in the mapping module 209 include combinations of print client indicators, i.e., multiple print client indicators in one column of the mapping table. If a matching entry exists for the combination of print client indicators, the corresponding media selection parameters for the combination of print client indicators are transmitted from the parameter determination module 208 as the final media selection parameters, as long as the corresponding media selection parameters are defined and operational.

Figure 3:
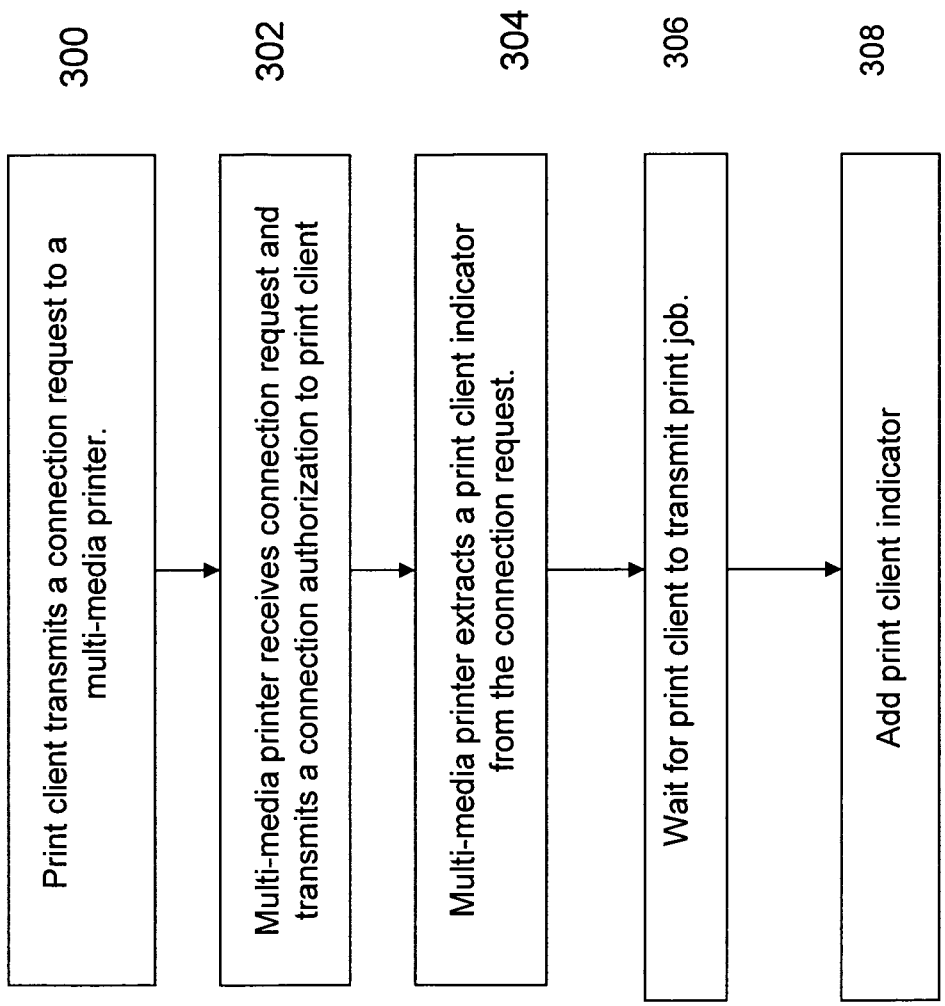
FIG. 3 illustrates a method of initially establishing a connection between a print client and a multi-media printer and transferring a print client identifier to the multi-media printer according to an embodiment of the present invention.

FIG. 3 illustrates a method of initially establishing a connection between a print client and a multi-media printer and transferring a print client identifier to the multi-media printer according to an embodiment of the present invention. A print client, resident on a medical imaging device or a computing device, transmits 300 a connection request to the multi-media printer. In an embodiment of the invention, the print client transmits a TCP connection request. A multi-media printer receives the connection request and transmits 302 a connection authorization to the print client.

The multi-media printer also extracts 304 a print client indicator from the connection request. The print client indicator may be a TCP port number. The print client indicator may be a text attribute, such as a user name, a password, a queue, a logical device name, a source file name, a destination file name, a destination directory name, a DICOM AE title, or any other free form text attribute. Alternatively, the print client indicator may be a network identity. The print client indicator may be a modality indicator. The multi-media printer may extract a plurality of print client indicators from the connection request. The print client indicator may be stored in the RAM 210 (see FIG. 2) of the multi-media printer 200.

In an embodiment of the present invention, the multi-media printer 200 may have to decode the print client identifier. In an embodiment of the present invention, the multi-media printer 200 may not decode the print client identifier because the print client identifier was not originally encoded. The multi-media printer waits 306 for the print client to submit a job to the multi-media printer.

The multi-media printer receives the print job from the print client. The multi-media printer may add 308 the print client indicator or the plurality of print client indicators to the print job. In an embodiment of the invention, the multi-media printer may append the print client indicator or the plurality of print client indicators to the print job.

In an embodiment of the invention, the table in the mapping module 209 may be created or updated by loading a removable memory device, e.g., memory card, memory stick, etc., into the multi-media printer 200. The removable memory device may include a list of new entries, i.e., print client indicators and media selection parameters, in a predetermined format. The list of new entries may be added to the table in the mapping module 209. The removable memory device may contain and define the table in the mapping module 209. The list of new entries may include brand new entries and may also include entries that replace old mapping module entries. In an embodiment of the invention, the list of new entries may be submitted to the multi-media printer in a pre-determined format from a print client. In an embodiment of the invention, the print client may also submit a command including a list of new entries, wherein the new entries include print client indicators and media selection parameters. In another embodiment of the invention, a system administrator on the network may login to the multi-media printer 200 and edit the mapping module entries or add in new entries. In an embodiment of the invention, the mapping module entries may be created by entering print client indicators and corresponding media selection parameters from the operation panel 212 of the multi-media printer 200.

Figure 4:
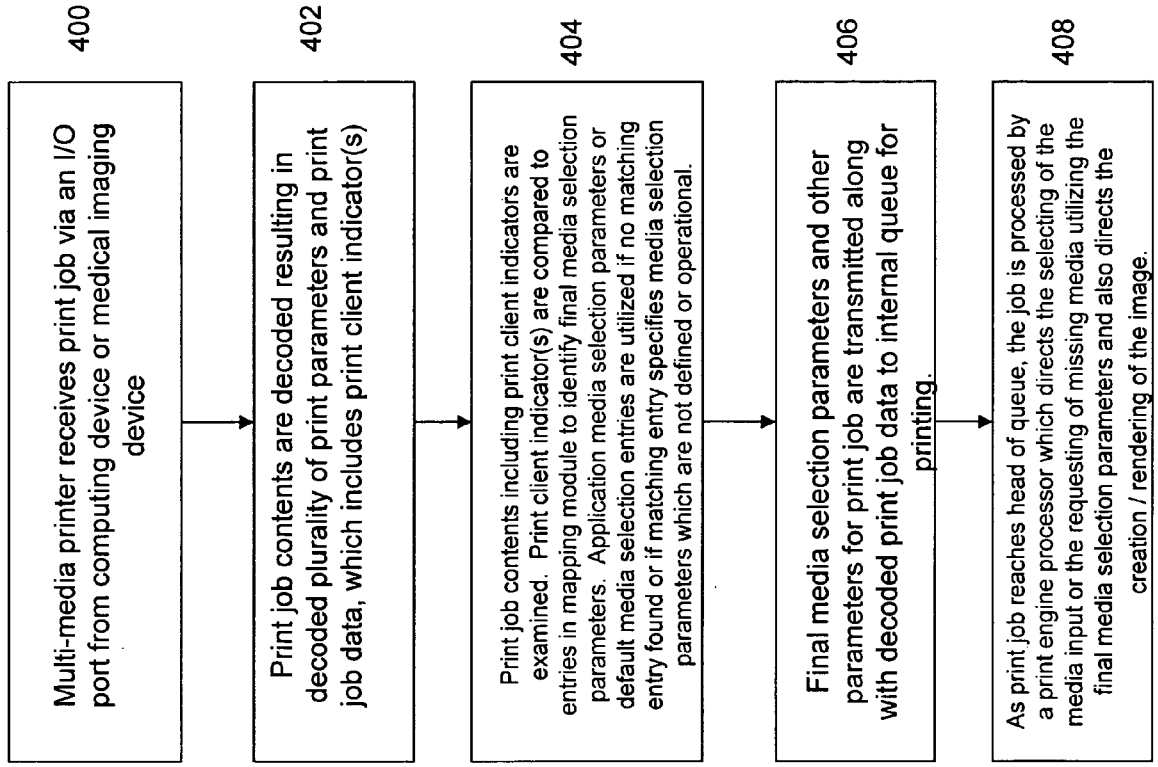
FIG. 4 illustrates a method of processing a print job utilizing print client indicators according to an embodiment of the present invention.

FIG. 4 illustrates a method of processing a print job utilizing print client indicators according to an embodiment of the present invention. A multi-media printer receives 400 a print job via an input/output port. The multi-media printer may receive the print job from a computing device or a medical imaging device located on the same computing network 100 (see FIG. 1) as the multi-media printer 200 (see FIG. 2).

The print job contents may be decoded 402 resulting in a decoded plurality of print parameters and decoded print job data. The decoded print job contents include a print client indicator(s). Illustratively, the print client indicator(s) may be a text attribute, a TCP port, a source network identity, a destination network identity, or a modality indicator, or a combination of the previously listed indicators. The print job contents may be decoded utilizing a DICOM decoder, a Postscript decoder, a USB decoder, a parallel port decoder, an FTP decoder, a LPR decoder, a PAP decoder, or email protocol decoders.

The print client indicator(s) are examined 404. The print client indicator(s) are examined to determine media size and media type. Default configuration parameters including default media selection parameters that may be stored on a smart card device or other non-volatile storage device are also utilized along with the print client indicators. The print client indicator(s) may be compared, utilizing a mapping module 209 (see FIG. 2), to a table including a plurality of entries, where each entry includes a print client indicator(s) and a corresponding job settings file. The print client indicator(s) may be compared, utilizing a mapping module to a table including a plurality of entries, where each entry includes a print client indicator(s) and corresponding media selection parameters. The print client indicators are compared to entries in a mapping table 209 to determine selected media selection parameters.

Figure 5:
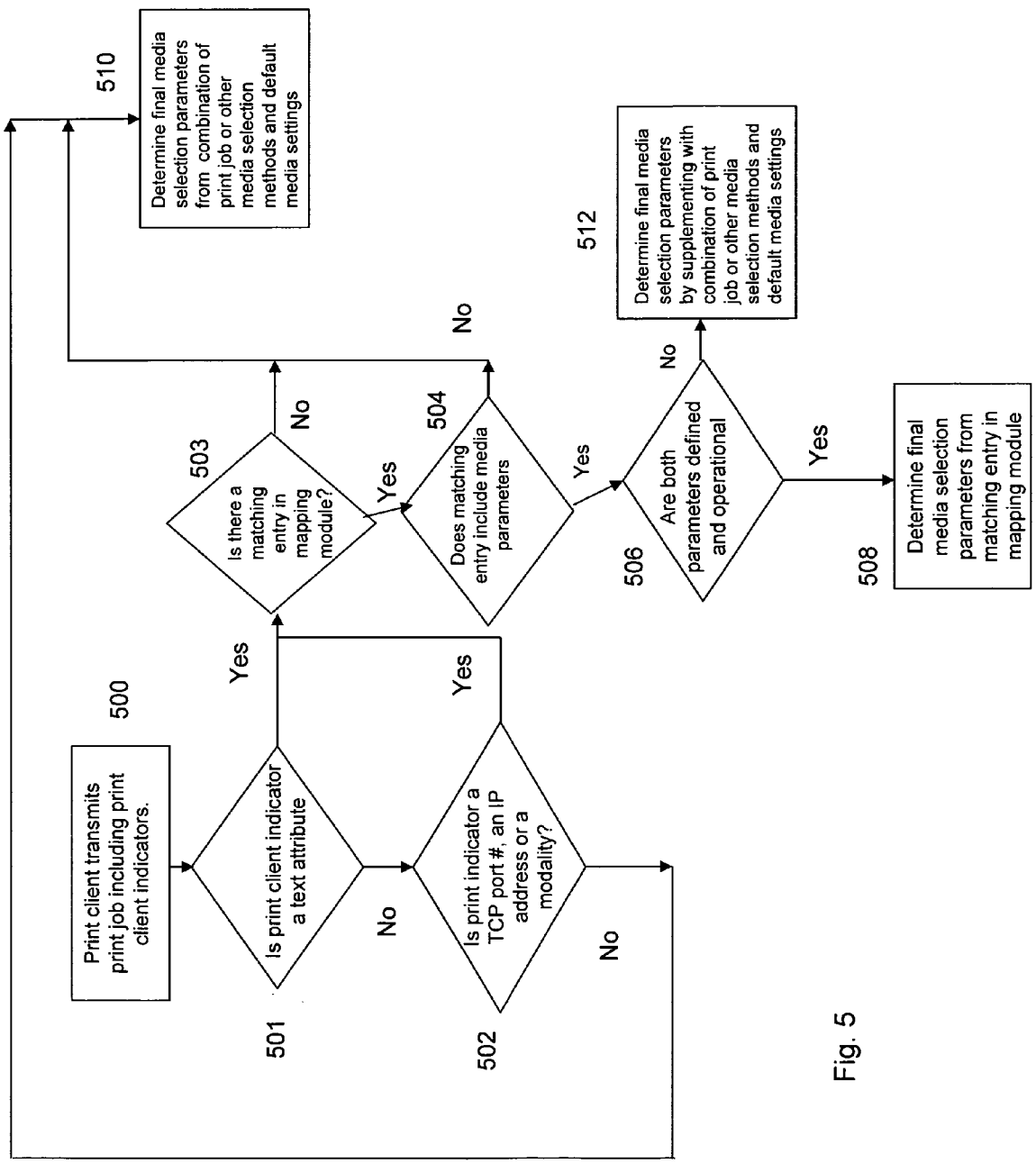
FIG. 5 illustrates a method of selecting final media selection parameters utilizing print client indicators(s) according to an embodiment of the present invention.

FIG. 5 illustrates one method of selecting final media selection parameters utilizing print client indicator(s) according to an embodiment of the present invention. The print client transmits 500 a print job including a plurality of print parameters and print data. The parameter determination module receives the print job contents including the decoded plurality of print parameters, the print job data, and the print client indicator. The parameter determination module determines 501 if the print client indicator is a text attribute. If the print client indicator is a text attribute, the parameter determination module identifies 503 if the text attribute has a matching entry in the mapping module. If the text attribute print client indicator has a matching entry, the parameter determination module determines 504 if the matching entry includes media selection parameters. If the matching entry includes media selection parameters, the media selection parameters of the matching entry are evaluated to determine 506 if both of the media selection parameters are defined and operational. If both the media selection parameters are defined and operational, the media selection parameters are utilized 508 as the final media selection parameters for the transmitted print job. If either of the media selection parameters are not defined or not operational, the media selection parameters are supplemented with 512 a combination of print job or other media selection methods, e.g., application specific parameters, and the default media settings.

If the print client indicator is not a text attribute, the print client indicator is evaluated to determine 502 if it is a TCP port number, a network identity, or a modality indicator. If the print client indicator is a TCP port number, a network identity, or a modality indicator, the print client indicator is analyzed to determine 503 if there is a matching entry in the mapping module. If there is a matching entry, the matching entry is evaluated to determine 504 if there are media selection parameters. If the matching entry includes media selection parameters and both of the media selection parameters are operational and defined 506, the media selection parameters from the matching entry are utilized 508 as the final media selection parameters. If either of the media selection parameters are not defined or not operational, the media selection parameters are supplemented with 512 a combination of print job or other media selection methods, e.g., application specific parameters, and the default media settings.

If the print client indicator is not a text attribute 501 and if the print client indicator is not a TCP port number, a network identity, or a modality 502, the media selection parameters are defined by 510 a combination of print job or other media selection methods, e.g., application specific parameters, and the default media settings. Similarly, if a print client indicator is present, but there is no matching entry in the mapping module 503 or if the matching entry does not include media selection parameters 504, the final media selection parameters are defined by 510 a combination of print job or other media selection methods and the default media settings.

Returning to the flowchart of FIG. 4, after the print job media selection parameters are finalized, the final print job parameters including the final media selection parameters and the decoded print job data are transmitted 406 to an internal queue. The final print job parameters including the final media selection parameters and the print job data reside in the queue. The queue may be a FIFO queue or alternatively a queue with different priority schemes. The print job parameters may also include a parameter that specifies a priority of the print job. If the print job includes a final print parameter with a high or medium priority parameter, the print job may be pushed to a higher position, i.e., closer to being processed, within the queue. In some embodiments of the invention, the queue may reside on a non-volatile storage medium, such as a hard disk or a removable disk drive.

When the final print job parameters including the final media selection parameters and the print job data reach the head of the queue, the final print job parameters including the final media selection parameters and print job data are transmitted 408 to the print engine processor. The print engine processor 220 (see FIG. 2) receives the final print job parameters including the final media selection parameters and transmits instructions to the media supply subsystem 222 (see FIG. 2) in order to select the media supply or to place media in the media supply. The print engine processor 220 also transmits instructions to the printing subsystem 224, either the direct thermal printing system or the dye-diffusion printing system, to produce or render an image corresponding to the print data in accordance with the final print job parameters.

FIGS. 6(a), 6(b), and 6(c) illustrate tables in a mapping module according to an embodiment of the present invention. These three tables are only illustrative of potential tables within the mapping module of the present invention. FIG. 6(a) illustrates a table including entries with print client indicators and job settings files according to an embodiment of the present invention. As illustrated in FIG. 6(a), one field of the table in the mapping module is a list of text attributes. Illustratively, CTImages is AETitle text attribute, PACImages is a AETitle text attribute, NMImages is an AETitle text attribute, and MRIimages is a AETitle text attribute. Each of the text attributes reference a job settings file named with the same term or phrase as the text attribute. The contents of the job settings file may or may not include media selection parameters. For example, the PACImages and NMImages job settings files both include media selection parameters, but the CTImages and MRImages job settings do not include media selection parameters.

FIG. 6(b) illustrates a table including entries with print client indicators and media selection parameters according to an embodiment of the present invention. In this illustration, the print client indicator may be a destination network identity, e.g., a destination IP address. Illustratively, destination IP address 192.168.100.1, destination IP address 192.168.100.4, destination IP address 192.168.100.12, and destination IP address 192.168.100.15 are entries in the print client indicator fields of the mapping module. Each of these print client indicators map to at least one media selection parameter. For example, destination IP address 192.168.100.1 maps to blue film media type and 11×14 media size. In addition, destination IP address 192.168.100.4 maps to grayscale paper media type and A4 media size.

FIG. 6(c) illustrates a print client identifier section of a mapping table including priority designations and a combination of print client indicators according to an embodiment of the present invention. In this illustrative print client identifier section, seven illustrative entries are included. The mapping table may include a plurality of entries. In one embodiment of the invention, the mapping table may include 32 entries. In other embodiments of the invention, the mapping table may include 64, 128, 256, or any integer number of entries. Although the mapping table illustrated in FIG. 6 includes only five different print client indicators (username, destination network identity, source network identity, text attribute, TCP port number), the mapping table could include seven print client indicators (also including user password, modality indicators), more than seven print client indicators, or less than seven print client indicators.

Each of the mapping table entries may include a priority designation. The priority designation is utilized to instruct the multi-media printer, e.g., the parameter determination module, on which mapping table entry to select, and thus, what media selection parameters to select. The priority designation may be utilized when the multi-media printer extracts more than one print client indicator and multiple mapping table entries corresponding to the more than one print client indicator.

For example, as illustrated in FIG. 6(c), a multi-media printer may extract five print client indicators from an incoming print job. A text attribute print client indicator of "BF1114", a print client username of "CT11", a TCP port number of 104, a IP destination address of 192.168.100.1 and an IP source address of 192.168.100.2 may be extracted by the multi-media printer. If priority designations were not included, the multi-media printer may select any one of the first three entries in the illustrative section of the mapping table of FIG. 6 because the each of the first three mapping table entries match the extracted print client indicators. For example, in entry 3, the text attribute field, the print client username, and the destination IP address match. The multi-media printer may be configured to select the entry with the highest priority. Thus, in this example, the multi-media printer would select the first entry, with priority designation 1, and the media selection parameters would be blue film 11×14. In another embodiment, the priority is determined by the location of the entry in the mapping table, e.g., the first entry in the mapping table has the highest priority.

In addition, a priority designation may identify that one of the print client indicators is to have a higher priority level than another print client indicator. Illustratively, if the multi-media printer extracts a print client username print client indicator of MRI11 and an IP destination address of 192.168.100.1 from a print job and no matching entry is present in the mapping table with these two client indicators, the multi-media printer, based on the priority designation, selects the entry which includes the print client username of MRI11. The media selection parameters corresponding to this entry, i.e., film media type and A4 media size, are selected and output.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method of determining final media selection parameters, comprising:

receiving, at a printer, a print job including a print client indicator, the print client indicator being existing information in the communication protocol being utilized to send the print job from a print client, wherein the existing information is typically not used to determine media selection parameters; and selecting at least one of the final media selection parameters that is used to select media onto which content included in the print job received at the printer is to be printed based on the existing information that is typically not used to determine media selection parameters, wherein said selecting the at least one of the media selection parameters comprises:

comparing the print client indicator to a plurality of entries in a mapping module;

determining if a matching entry including the print client indicator exists in the mapping module;

determining if the matching entry includes a media selection parameter specifying a media type, a media size, or a media type and a media size for the print job;

determining if the media type, the media size, or the media type and the media size specified by the media selection parameter is defined and operational for the printer; and outputting the media selection parameter as one of the final media selection parameters if the matching entry exists in the mapping module and the media type, the media size, or the media type and the media size specified by the media selection parameter is defined and operational.

2. The method of claim 1, wherein the print client indicator is a network identity.

3. The method of claim 1, wherein the print client indicator is a Transmission Control Protocol (TCP) port number.

4. The method of claim 1, wherein the print client indicator is a modality indicator.

5. The method of claim 1, wherein the print client indicator is a text attribute.

6. The method of claim 5, wherein the text attribute is one of a username, a password, a queue name, a logical device name, an AppleTalk ID, a source file name, a destination file name, a destination directory name, a DICOM AE Title, source IP address alias, destination IP address alias, and a free form text field.

7. The method of claim 1, wherein the print client indicator is at least two of network identity, a Transmission Control Protocol (TCP) port number, a modality indicator, and a text attribute.

8. The method of claim 7, wherein the at least two of the network identity, the TCP port number, the text attribute, and the modality indicator correspond to multiple matching entries and a priority indicator determines one of the multiple matching entries that is selected along with the corresponding media selection parameters.

9. The method of claim 1 further comprising:

if the media selection parameter is not defined or not operational, or if the matching entry does not exist in the mapping module, outputting another media selection parameter as one of the final media selection parameters based on other information that is typically used to determine media selection parameters.

10. The method of claim 9, wherein the other information comprises an application specified media selection parameter.

11. A program code storage device, comprising:
a machine-readable storage device; and machine-readable program code, stored on the machine-readable storage device, having instructions, which when executed cause a multimedia printer to:

receive, at a printer, a print job including a print client indicator, the print client indicator being existing information in the communication protocol being utilized to send the print job from a print client, wherein the existing information is typically not used to determine media selection parameters; and select at least one of the final media selection parameters that is used to select media onto which content included in the print job received at the printer is to be printed based on the existing information that is typically not used to determine media selection parameters, wherein said selection of the at least one of the media selection parameters comprises execution of the instructions to cause the multi-media printer to:

compare the print client indicator to a plurality of entries in a mapping module; determine if a matching entry including the print client indicator exists in the mapping module;

determine if the matching entry includes a media selection parameter specifying a media type, a media size, or a media type and a media size for the print job;

determine if the media type, the media size, or the media type and the media size specified by the media selection parameter is defined and operational for the printer; and output the media selection parameter as one of the final media selection parameters if the matching entry exists in the mapping module and the media type, the media size, or the media type and the media size specified by the media selection parameter is defined and operational.

12. The program code storage device of claim 11, wherein the print client indicator is a network identity.

13. The program code storage device of claim 11, wherein the print client indicator is a Transmission Control Protocol (TCP) port number.

14. The program code storage device of claim 11, wherein the print client indicator is a modality indicator.

15. The program code storage device of claim 11, wherein the print client indicator is a text attribute.

16. The program code storage device of claim 15, wherein the text attribute is one of a username, a password, a queue name, a logical device name, a AppleTalk ID, a source file name, a destination file name, a destination directory name, a DICOM AE Title, a source IP address alias, a destination IP address, and another free-form text field.

17. The program code storage device of claim 11, wherein the print client indicator is at least two of an Internet Protocol (IP) address, a Transmission Control Protocol (TCP) port number, a modality indicator, and a text attribute.

18. The program code storage device of claim 17, wherein the at least two of the network identity, the TCP port number, the text attribute, and the modality indicator correspond to multiple matching entries and a priority indicator determines one of the multiple matching entries that is selected along with the corresponding media selection parameters.

19. A multi-media printer to render an image from a submitted print job, comprising:

a decoding module to receive the submitted print job and to extract at least one print client indicator from the submitted print job, the print client indicator being existing information in the communication protocol being utilized to send the submitted print job from a print client, wherein the existing information is typically not used to determine media selection parameters;

a mapping module including a plurality of entries, each of the plurality of entries including at least one print client indicator and a corresponding media selection parameter; and a parameter determination module to receive the at least one print client indicator from the decoding module, to compare the at least one print client indicator to the plurality of entries in the mapping module to determine if a matching entry corresponds to the at least one print client indicator, to determine if a media type, a media size, or a media type and a media size for the print job indicated by the corresponding media selection parameter associated with the matching entry is defined and operational, and to output the corresponding media selection parameter as one of the final media selection parameters to select media onto which the image included in the print job is to be printed by the multi-media printer if the matching entry is found in the mapping table and if the media type, the media size, or the media type and the media size specified by the corresponding media selection parameter is defined and operational.

20. The multi-media printer of claim 19, wherein the mapping module is stored on a mass storage device internal to the multi-media printer.

21. The multi-media printer of claim 19, wherein the mapping module is stored on a removable memory device.

22. The multi-media printer of claim 19, wherein the mapping module is updated via an operation panel of the multi-media printer.

23. The multi-media printer of claim 19, wherein the mapping module is updated by transmitting a file in a pre-determined format to the multi-media printer.

24. The multi-media printer of claim 19, wherein the mapping module is updated by transmitting a command from a print client.

25. The multi-media printer of claim 19, wherein the print client indicator is a TCP port number.

26. The multi-media printer of claim 19, wherein the print client indicator is a network identity.

27. The multi-media printer of claim 19, wherein the print client indicator is a modality indicator.

28. The multi-media printer of claim 19, wherein the print client indicator is a text attribute.

29. The multi-media printer of claim 19, wherein the at least one print client indicator has multiple mapping entries in the mapping module and a priority indicator identifies one of the multiple entries as the matching entry.

30. A multi-media printer to render an image from a submitted print job, comprising:

a decoding module to receive the submitted print job and to extract at least one print client indicator from the submitted print job, the print client indicator being existing information in the communication protocol being utilized to send the submitted print job from a print client, wherein the existing information is typically not used to determine media selection parameters;

a mapping module including a plurality of entries, each of the plurality of entries including at least one print client indicator and a corresponding job settings file, and a parameter determination module to receive the at least one print client indicator from the decoding module, to compare the at least one print client indicator to the plurality of entries in the mapping module to determine if a matching entry corresponds to the at least one print client indicator, to determine if the job settings file in the matching entry includes at least one media selection parameter specifying a media type, a media size, or a media type and a media size for the print job, to determine if the media type, the media size, or the media type and the media size specified by the at least one media selection parameter is defined and operational, and to output the at least one media selection parameter as one of the final media selection parameters to select media onto which the image included in the print job is to be printed by the multi-media printer if the job settings file in the matching entry is found in the mapping module and the media type, the media size, or the media type and the media size specified by the at least one media selection parameter is defined and operational.

31. The multi-media printer of claim 30, wherein the mapping module is updated by one of 1) via an operation panel; 2) transmitting a file in a pre-determined format to the multi-media printer; and 3) transmitting a command from a print client.

32. The multi-media printer of claim 30, wherein the print client indicator is one of a TCP port, a network identity, a modality indicator, and a text attribute.

33. The multi-media printer of claim 32, wherein the at least one print client indicator includes multiple, mapping entries in the mapping module and a priority indicator identifies one of the multiple entries as the matching entry.

34. A method of determining final media selection parameters, comprising:

receiving, at a printer, a print job including a print client indicator, the print client indicator being existing information within the print job from a print client, wherein the existing information is typically not used to determine media selection parameters; and selecting at least one of the final media selection parameters that is used to select media onto which content included in the print job received at the printer is to be printed based on the existing information that is typically not used to determine media selection parameters, wherein said selecting the at least one of the media selection parameters comprises:

comparing the print client indicator to a plurality of entries in a mapping module;

determining if a matching entry including the print client indicator exists in the mapping module;

determining if the matching entry includes a media selection parameter;

determining if a media type, a media size, or a media type and a media size for the print job specified by the media selection parameter is defined and operational; and outputting the media selection parameter as one of the final media selection parameters if the matching entry exists in the mapping module and the media type, the media size, or the media type and the media size specified by the media selection parameter is defined and operational.

35. The method of claim 34, wherein the print client indicator is a network identity.

36. The method of claim 34, wherein the print client indicator is a Transmission Control Protocol (TCP) port number.

37. The method of claim 34, wherein the print client indicator is a modality indicator.

38. The method of claim 34, wherein the print client indicator is a text attribute.

39. The method of claim 38, wherein the text attribute is one of a username, a password, a queue name, a logical device name, an AppleTalk ID, a source file name, a destination file name, a destination directory name, a DICOM AE Title, source IP address alias, destination IP address alias, and a free form text field.

* * * * *